(12) United States Patent
Kanto et al.

(10) Patent No.: US 6,717,905 B2
(45) Date of Patent: Apr. 6, 2004

(54) OPTICAL HEAD AND METHOD OF MAKING THE SAME

(75) Inventors: Nobuyuki Kanto, Kawasaki (JP); Goro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 10/058,720

(22) Filed: Jan. 28, 2002

(65) Prior Publication Data

US 2003/0081529 A1 May 1, 2003

(30) Foreign Application Priority Data

Oct. 31, 2001 (JP) ........................................ 2001-334326

(51) Int. Cl.[7] ................................................ G11B 7/00
(52) U.S. Cl. .............................. 369/112.24; 369/112.01; 369/44.23
(58) Field of Search ......................... 369/44.12, 44.14, 369/44.23, 44.27, 112.01, 112.08, 112.13, 112.2, 112.23, 112.24, 112.25

(56) References Cited

U.S. PATENT DOCUMENTS 6,529,449 B1 * 3/2003 Jordan et al. ............ 369/13.33
6,631,099 B1 * 10/2003 Kouchiyama ............ 369/44.22
6,657,927 B1 * 12/2003 Awano et al. ............ 369/13.32

FOREIGN PATENT DOCUMENTS

JP          11-242801         9/1999
JP          2001-067747       3/2001

* cited by examiner

Primary Examiner—Muhammad Edun
(74) Attorney, Agent, or Firm—Greer, Burns & Crain, Ltd.

(57) ABSTRACT

An optical head includes a lens holder for carrying a biconvex lens and a plano-convex lens above a data storage disk. In data-writing or data-reading operation, the plano-convex lens comes closer to the storage disk than the biconvex lens. The plano-convex lens is accommodated in a through-hole formed in the lens holder. The lower opening of the through-hole is closed by a transparent plate attached to the bottom surface of the lens holder. The flat lens surface of the plano-convex lens is held in close contact with the transparent plate.

15 Claims, 6 Drawing Sheets

OPTICAL HEAD AND METHOD OF MAKING THE SAME

BACKGROUND OF THE INVENTION

1. Field of the Invention

The present invention relates to an optical head used for data-writing or data-reading with an optical storage medium. It also relates to a method of making such an optical head.

2. Description of the Related Art

To improve the data storage density of a magneto-optical disk, several methods have been proposed in the past. One of them is to increase the numerical aperture (NA) of the objective lens. The use of a lens having a higher NA makes it possible to produce a smaller laser spot on the recording layer of the storage disk, and hence an improved data storage density will result. The increase of the NA can be achieved by using two or more lenses in combination. These lenses may be attached to a lens holder of the optical head. As known in the art, coma, caused by the tilt of the storage disk, will become greater in proportion to the third power of the NA, while spherical aberration, caused by unevenness of the disk thickness, will increase in proportion to the fourth power of the NA. Thus, without taking any precaution, these aberrations may become unacceptably larger as the NA increases. Further, it is necessary to use a surface-recording type magnetic modulation coil in order to increase the data transfer speed and also to improve the data storage density.

In light of the above, the front illumination type optical heads have often been employed. In this system, the transparent substrate of the disk does not come between the recording layer of the disk and the optical head, and instead the recording layer is held in direct facing relation to the optical head. To improve the NA of the lens system in the front illumination type, the optical head includes a lens holder to which a combination of two lenses is attached. The lens holder may also carry a coil needed for generating a magnetic field. Such an optical head is often designed as a slider which floats slightly over the storage disk in rotation by the action of the air drawn between the optical head and the magneto-optical disk. Thus, the above coil can be brought very close (in the micron or submicron order) to the storage disk. Accordingly, the data storage density and data transfer speed can both be improved.

Unfavorably, the above-described conventional optical head has the following drawbacks.

When the two lenses are not positioned accurately to the lens holder, come will occur. As noted above, coma will become greater as the NA is rendered higher. Thus, considerable care should be taken in installing the lenses on the lens holder. In particular, the lens near the storage disk should be positioned with greater accuracy than the farther lens.

In the prior art, however, no particular precaution to prevent the tilting of the lens has been taken. Accordingly, it is difficult to achieve efficient fabrication of high-quality optical heads.

SUMMARY OF THE INVENTION

The present invention has been proposed under the circumstances described above. It is, therefore, an object of the present invention to provide high-quality optical heads in which the occurrence of coma is eliminated or rendered less conspicuous than in the prior art.

Another object of the present invention is to propose an efficient method of making such advantageous optical heads.

According to a first aspect of the present invention, an optical head is provided which includes a lens holder, first and second lenses, a coil and a transparent plate. Specifically, the lens holder is formed with a throughhole and includes an obverse surface and a reverse surface opposite to the obverse surface. The obverse surface faces the optical data storage medium to be used. The first lens is supported by the lens holder. The second lens is arranged in the through-hole in a manner such that the second lens is closer to the storage medium than the first lens is. The coil generates a magnetic field. The transparent plate is bonded to the lens holder. The transparent plate includes a first surface on which the coil is provided and a second surface opposite to the first surface. The second lens is bonded to the second surface of the transparent plate.

With the above arrangement, it is easy to position the second lens accurately by depending upon the transparent plate. Accordingly, the occurrence of coma can be restrained to a great extent. Further, since the positioning of the second lens is performed simply by attaching the lens to the transparent plate, the fabrication efficiency of the optical head is advantageously improved.

Preferably, the transparent plate may entirely cover the obverse surface of the lens holder.

Preferably, the second lens may include a flat lens surface and a non-flat lens surface, wherein the flat lens surface is held in surface contact with the transparent plate.

Preferably, the second lens may be provided with a flange to be held in engagement with the through-hole of the lens holder. This arrangement ensures easy positioning of the second lens within the through-hole.

Preferably, the first lens may be attached to the reverse surface of the lens holder. In this manner, the positioning of the first lens can be easily performed depending upon the lens holder.

Preferably, the lens holder may be made of an electrically non-conductive material. To ensure sufficient rigidity, the lens holder is made of ceramics for example. However, some ceramic materials are electrically conductive, while others are not. If the lens holder is made of such a conductive material, the holder may need to be coated by a non-conductive layer for insulation from other conductive components (e.g. a lead for the magnetic field-generating coil). In this case, however, when the coil is powered, the lens holder may unfavorably have some capacitance, depending upon the forming condition of the insulating layer. In light of this, preferably the lens holder is made of a nonconductive material (alumina for example). Then, no insulating layer as noted above needs to be made on the lens holder. This is advantageous to improving the fabrication efficiency and providing excellent impedance characteristics.

Preferably, the second lens and the transparent plate may have equal or substantially equal refractivity, so that light is not reflected as proceeding from the second lens into the transparent plate. In this case, the assembly of the second lens and the transparent plate can be treated as a single lens that has a prescribed thickness (=[the second lens thickness]+[the transparent plate thickness]). This implies that the thickness of the second lens is made smaller when the transparent plate is provided. The amount of lens thickness reduction is proportional to the thickness of the transparent plate, so that the total thickness of the two components is constant. In other words, the second lens and the transparent plate are complementary in thickness.

Preferably, each of the first and the second lenses may be an achromatic lens. This is advantageous to coping well with the shift in wavelength of the light beam.

Preferably, the lens holder may be supported by an elastic suspension so as to float above the storage medium when the storage medium rotates.

According to a second aspect of the present invention, an optical disk apparatus is provided which includes a data-recording optical disk, a first optical head and a second optical head. Specifically, the optical disk includes a first surface and a second surface opposite to the first surface. The first optical head faces the first surface of the disk. The second optical head faces the second surface of the disk and is arranged symmetrically to the first optical head with respect to the optical disk. Each of the first and the second optical heads includes: a lens holder formed with a through-hole; a plano-convex lens arranged in the through-hole and including a flat lens surface; and a transparent plate bonded to the lens holder. The transparent plate is held in surface contact with the flat lens surface.

Preferably, the first and the second optical heads may be urged toward the optical disk with an equal or substantially equal force, so that the disk between the two optical heads will not warp or deform in any unfavorable manner.

According to a third aspect of the present invention, a method of making an optical head is provided which includes the following steps.

To begin with, a transparent first plate is prepared. Then, a plurality of coils are formed on the first plate. To cover the coils, an insulating protection layer is formed. Then, a second plate formed with a plurality of through-holes is prepared. By bonding the first and the second plates to each other, a plate assembly is produced. Then, a lens is placed in each of the through-holes. At this step, the lens is bonded to the first plate for accurate positioning.

Preferably, the method may further include the step of cutting the plate assembly in a manner such that each of the through-holes is kept undivided.

Preferably, the method of the present invention may further include the step of reducing a thickness of the first plate after the protection layer forming step and before the plate assembly producing step.

Other features and advantages of the present invention will become apparent from the detailed description given below with reference to the accompanying drawings.

BRIEF DESCRIPTION OF THE DRAWINGS

FIGS. 3A–3B, 4A–4D, 5 and 6 illustrate a fabrication method of the optical head shown in FIG. 1, wherein FIG. 4C is a sectional view taken along lines IV—IV in FIG. 4B.

DETAILED DESCRIPTION OF THE PREFERRED EMBODIMENT

The preferred embodiments of the present invention will be described below with reference to the accompanying drawings.

Figure 1:
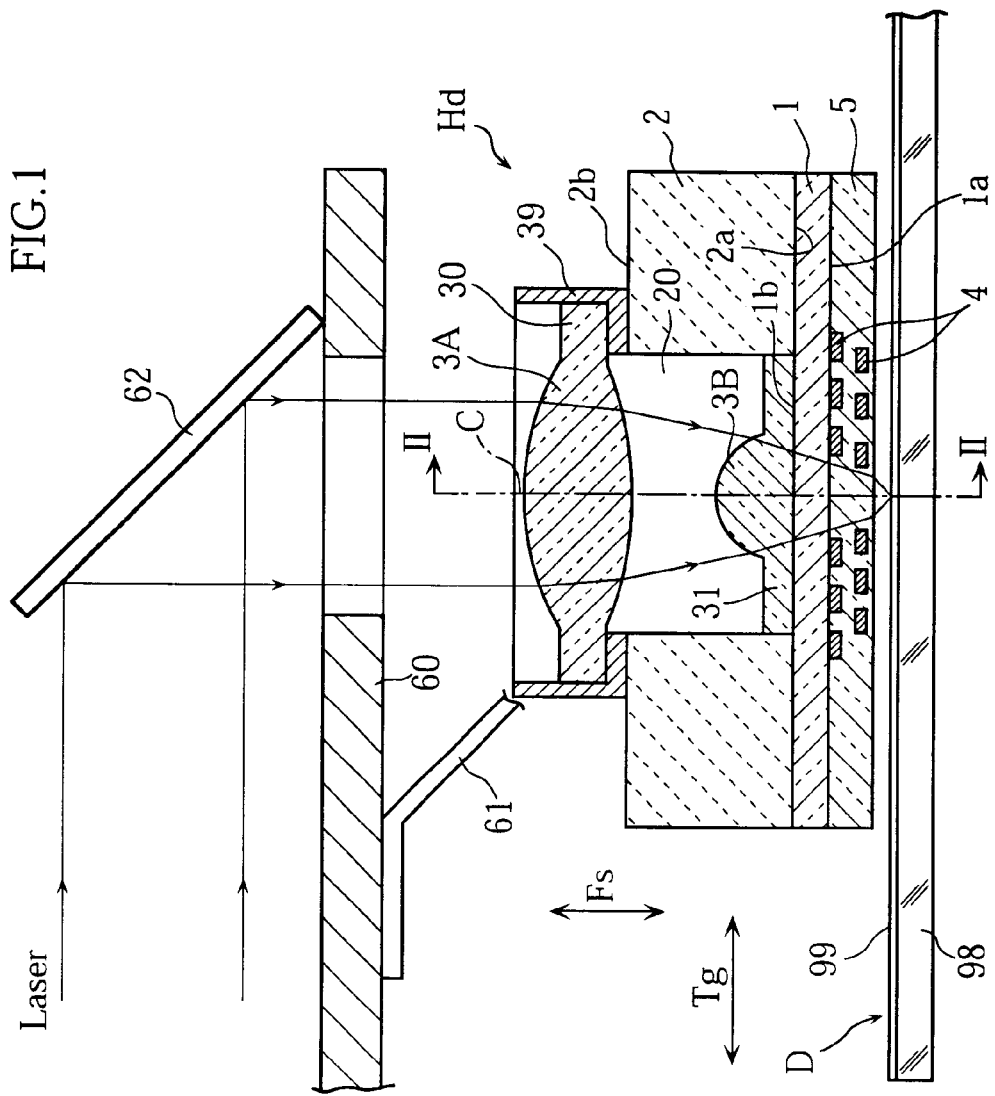
FIG. 1 is a sectional view showing an optical head embodying the present invention.
Figure 2:
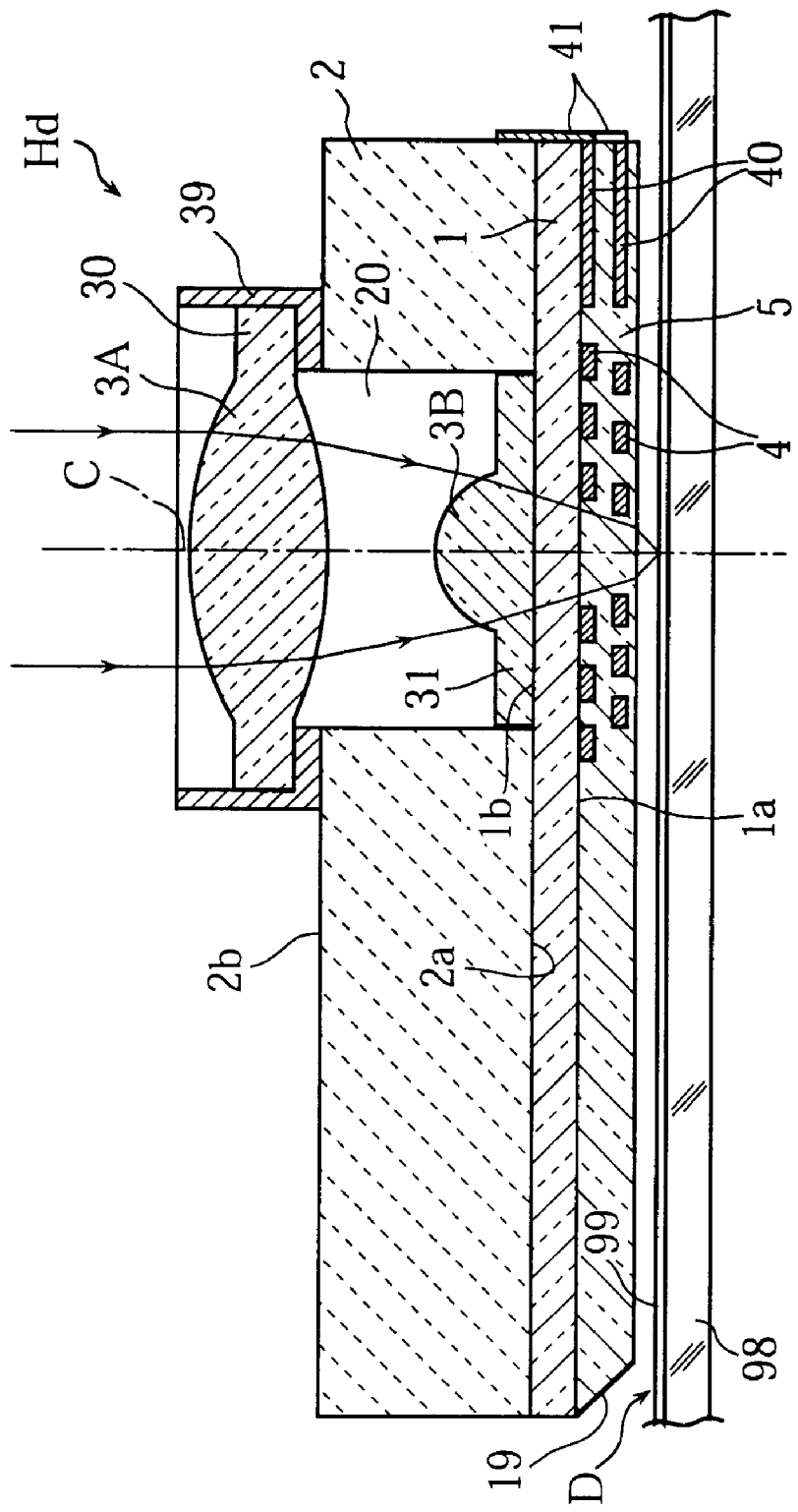
FIG. 2 is a sectional view taken along lines II—II in FIG. 1.

FIGS. 1 and 2 show an optical head Hd embodying the present invention. The optical head Hd includes a lens holder 2, a first object lens 3A, a second object lens 3B, a transparent plate 1, a coil 4 and an insulating protection layer 5.

The lens holder 2 is made of ceramics for example, and formed with a through-hole 20 extending in the vertical direction (thickness direction of the holder 2). The lens holder 2 is supported by a suspension 61 attached to a drive arm 60. The lens holder 2 is located above the recording layer 99 of a magneto-optical disk D. In the MO disk D, the recording layer 99 is formed on a transparent plate 98. In the illustrated embodiment, the front illumination system is adopted, whereby the optical head Hd and the recording layer 99 face each other directly.

The drive arm 60 is caused to reciprocate linearly in the radius direction of the MO disk D (tracking direction Tg). Alternatively, the arm 60 may be a swing arm designed to pivot about an axis. The arm 60 carries a mirror 62 at an end thereof. Thus, a horizontal laser beam emitted from a light source (not shown) is directed toward the first and the second lenses 3A, 3B. The suspension 61 is flexible in the focus direction Fs. When the MO disk D rotates at high speed, air is drawn between the disk D and protection layer 5. As a result, the optical head Hd will slightly float over the disk D. In other words, the optical head Hd serves as a slider.

The transparent plate 1 is made of glass for example. The plate 1 includes a lower surface 1a on which the coil 4 and the protection layer 5 are provided. The plate 1 also includes an upper surface 1b which is bonded (i.e., joined with glue) to the lower surface 2a of the lens holder 2. The upper surface 1b of the plate 1 is held in close contact with the entirety of the lower surface 2a of the holder 2. These contacting surfaces are both flat.

The protection layer 5 is chamfered to provide a slant end 19, as shown in FIG. 2. With this arrangement, air stably flows in between the optical head Hd and the disk D.

The first lens 3A is a convex lens formed with a flange 30. The first lens 3A is held in a cylindrical lens attachment 39. The lens attachment 39 is attached to the upper surface 2b of the lens holder 2. More specifically, the lens attachment 39 is bonded around the upper circumferential portion of the through-hole 20. As a result, the first lens 3A closes the upper part of the through-hole 20. Alternatively, the first lens 3A may be bonded directly to the lens holder 2 without using the lens attachment 39. In this case, the flange 30 of the first lens 3A is directly bonded to the upper surface 2b of the lens holder 2.

The second lens 3B is a plano-convex lens having a flat downward lens surface. The second lens 3B and the transparent plate 1 are equal or substantially equal in refractivity. In order to make effective the magnetic field generation and to reduce the inductance, the inner diameter of the coil 4 should be as small as possible. To cause the light beam to pass through the coil 4 properly, the second lens 3B and the transparent plate 1 are preferably made of a glass material having a high refractive index.

The refractive index of the protection layer 5 is also equal (or substantially equal) to that of the second lens 3B or transparent plate 1. In this manner, the second lens 3B, the transparent plate 1 and the protection layer 5 can be treated as one integral objective lens.

In addition, light will not be refracted greatly as proceeding from the lens 3B into the plate 1, and from the plate 1 into the protection layer 5. Therefore, the design of the lens is advantageously easy. Furthermore, it is possible to prevent the worsening of the wavefront aberration resulting from the thickness tolerance or positional deviation of the second lens 3B, the thickness tolerance of the transparent plate 1, or the wavelength variation of the laser beam.

The thickness of the second lens 3B is reduced in proportion to the thickness of the transparent plate 1. For example, it is now supposed that the thickness of the lens 3B needs to be X[mm] to achieve the required light-converging function when the transparent plate 1 is not used. Then, when the optical head Hd incorporates the transparent plate 1 whose thickness is Y[mm], the thickness of the second lens 3B is reduced from X[mm] to (X−Y)[mm].

The second lens 3B is accommodated in the through-hole 20 in a manner such that its lower surface is held in close contact with the upper surface 1b of the transparent plate 1. As in the first lens 3A, the second lens 3B is formed with a flange 31. The flange 31 may have a diameter of 1.7 mm when the inner diameter of the through-hole 20 is 1.8 mm for example. Thus, the second lens 3B is fitted into the through-hole 20 with slight play. The flange 31 is bonded (i.e., joined with glue) to the transparent plate 1.

The coil 4, having a spiral two-layer structure, is made of a conductive film. The coil 4 is connected to a pair of leads 40. The leads 40 extend from the coil 4 to one side surface of the protection layer 5 (see FIG. 2) On the same side of the layer 5 are formed two electrodes 41 that are connected to the leads 40. The electrodes 41 are connected to a power supply cable (not shown) for the coil 4. The center of the coil 4 coincides with the optical axis C of the laser beam. The laser beam, after passing through the second lens 3B, travels through the coil 4 to reach the disk D. The coil 4 is made as small in inner diameter as possible as long as it does not check the passage of the laser beam. The insulating protection layer 5 enclosing the coil 4 is transparent and has a flat bottom surface (facing the disk D). The protection layer 5 may be made of alumina or silicon dioxide ($SiO_2$).

Reference is now made to FIGS. 3A–3B, 4A–4D, 5 and 6 which illustrate a fabrication method of the above-described optical head Hd. As seen from the explanation given below, a plurality of identical optical heads can be collectively produced by the fabrication method.

Figure 3A:
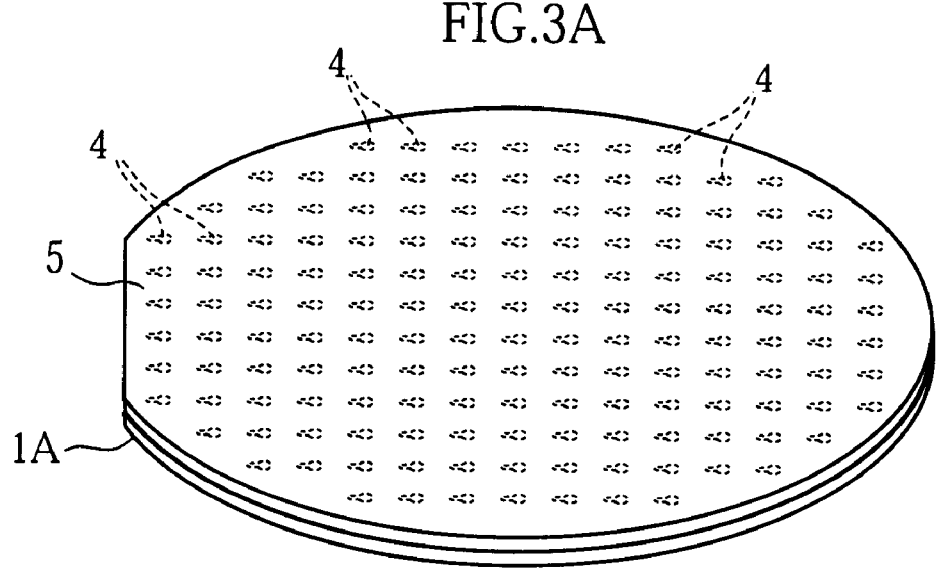
Figure 3A:
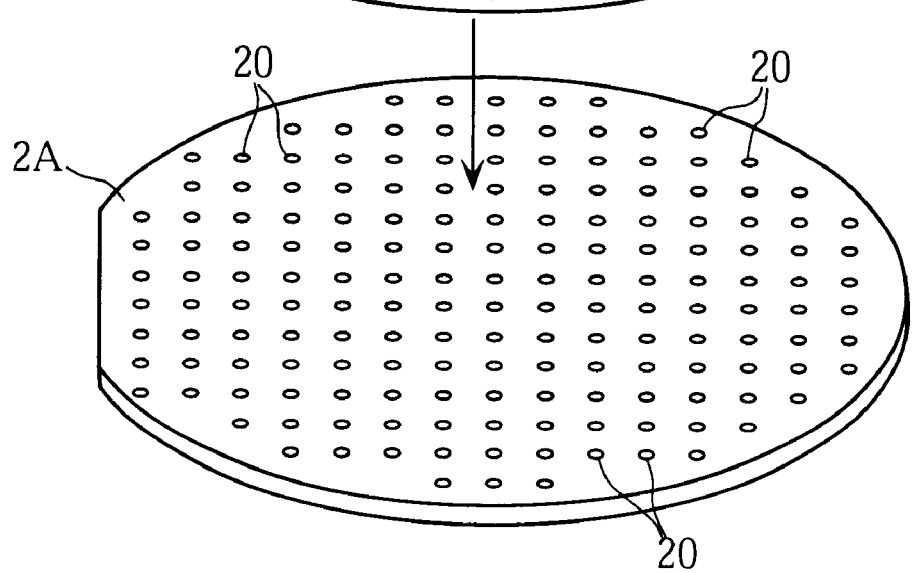

First, as shown in FIG. 3A, a first wafer 1A and a second wafer 2A are prepared. The first wafer 1A is formed with a plurality of coils 4 and insulating protection layer 5 in its upper surface. The first wafer 1A may be prepared in the following procedure.

Figure 4A:
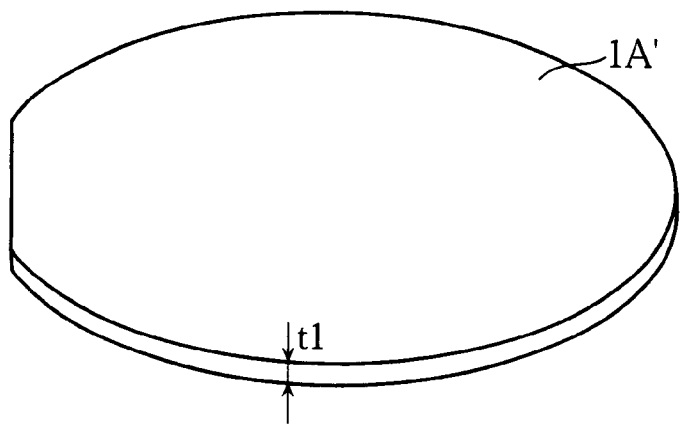
Figure 4B:
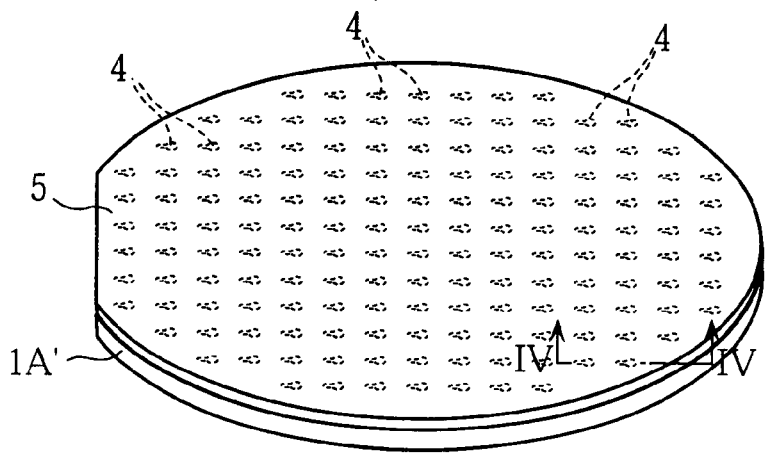
Figure 4C:
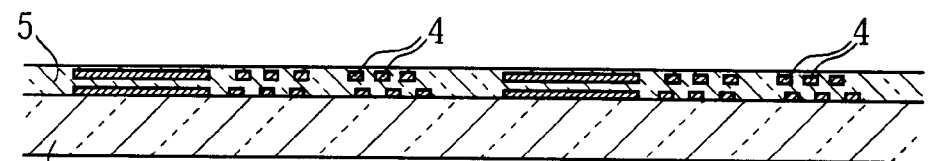

For producing the first wafer 1A, use is made of a transparent glass disk 1A', as shown in FIG. 4A. The glass disk 1A' has a thickness t1. On the upper surface of the disk 1A', a plurality of coils 4 are formed in a matrix layout. Such a coil may be produced in several ways. One way is as follows: A photoresist layer is formed on the glass disk 1A', and a spiral groove (corresponding to the desired coil element) is formed in the resist layer. Then, a conductive coil body is formed in the spiral groove by plating. Another way is to use sputtering or evaporation. In this case, a conductive layer is formed on the glass disk 1A', and then the conductive layer is etched to provide the desired coil pattern. In the illustrated embodiment, the coil 4 has a two-layer structure consisting of first and second spiral elements. Thus, the coil 4 is produced through several steps which include: a first step of forming the first spiral element; a second step of forming a protection layer to cover the first spiral element; a third step of forming the second spiral element on the protection layer; and a fourth step of forming an additional protection layer to cover the second spiral element. Besides these, a connection forming step is also included for connecting the first and the second spiral elements to each other. The protection layer 5 may be obtained by sputtering or ion-plating. The protection layer 5 has a thickness of about 8 μm for example.

Figure 4D:
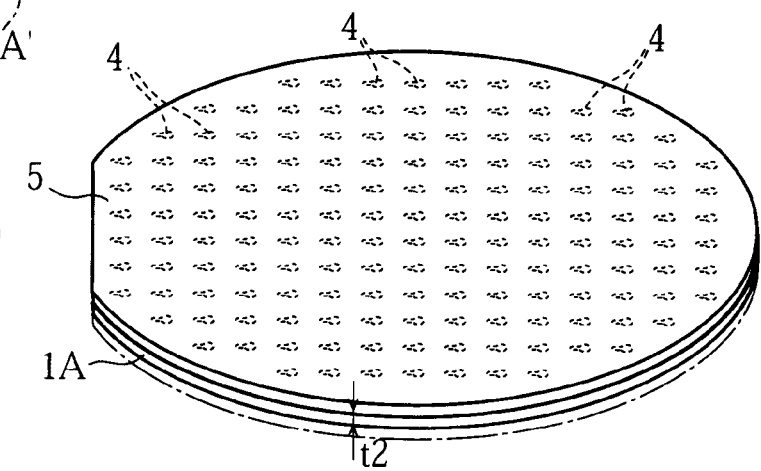

After the coils 4 and the protection layer 5 are formed, the bottom of the glass disk 1A' is subjected to grinding so that the thickness of the disk is reduced to t2, as shown in FIG. 4D. Thus, the first wafer 1A is obtained. The thickness t2 depends on the thickness of the second lens 3B. Specifically, the thickness t2 is determined so that the total thickness of the processed glass disk 1A' and the second lens 3B becomes equal to the required value. In the illustrated example, the thickness t2 is about 0.2 mm.

Referring to FIG. 3A, the second wafer 2A, made of ceramics, is the matrix from which the lens holder 2 as shown in FIGS. 1 and 2 is produced. The thickness of the wafer 2A is about 0.6 mm for example. The wafer 2A is formed with a plurality of through-holes 20 corresponding in position to the coils 4 formed on the first wafer 1A. Each through-hole 20 may be formed in the following manner. First, a small preliminary hole is made in the wafer 2A by laser processing for example. A conductive wire for electro-discharge machining is put through the preliminary hole. Then, voltage is applied to the wire so that the preliminary hole is enlarged up to the size of the desired through-hole 20.

Figure 3B:
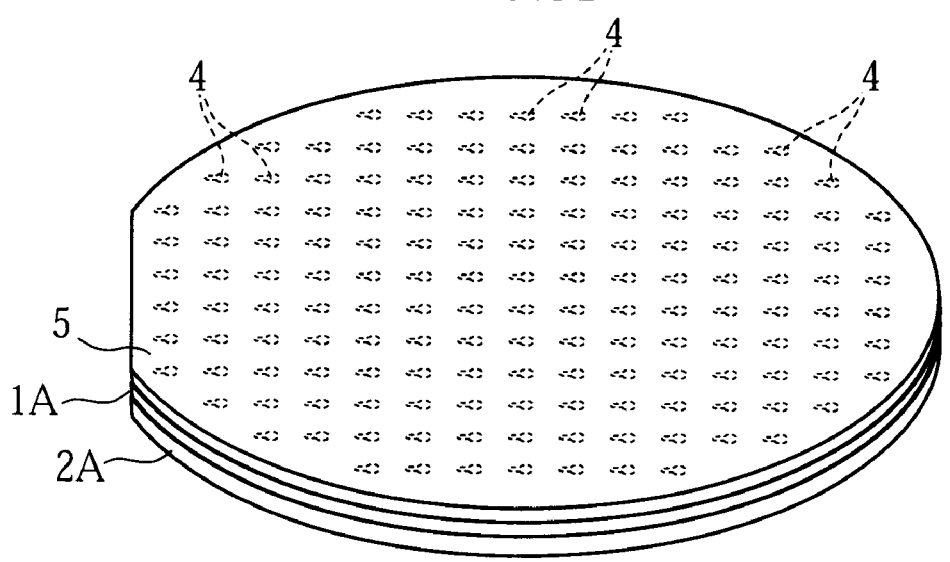

As shown in FIG. 3B, the first and the second wafers 1A, 2A are joined with glue. Precisely, the bottom surface of the first wafer 1A is attached to one side of the second wafer 2A in a manner such that the center of the respective coils 4 coincides with the center of the relevant one of the through-holes 20.

Figure 5:
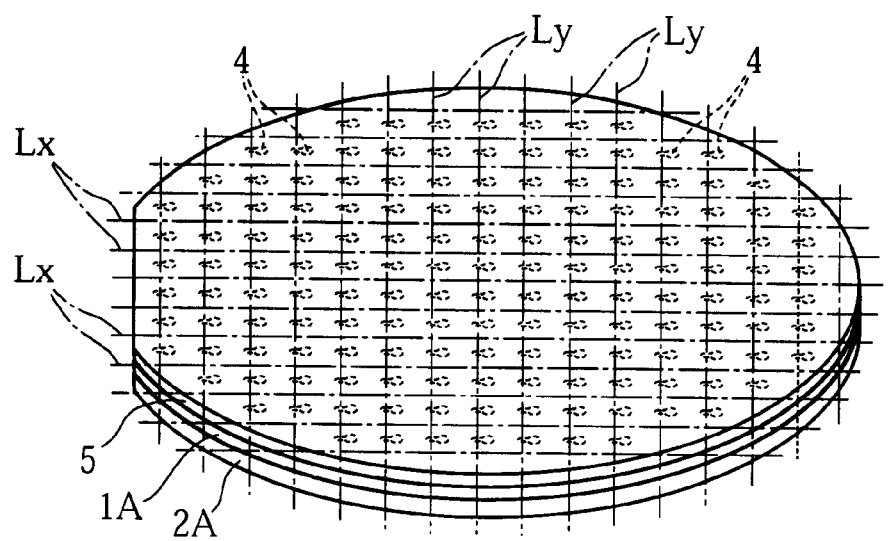
Figure 6:
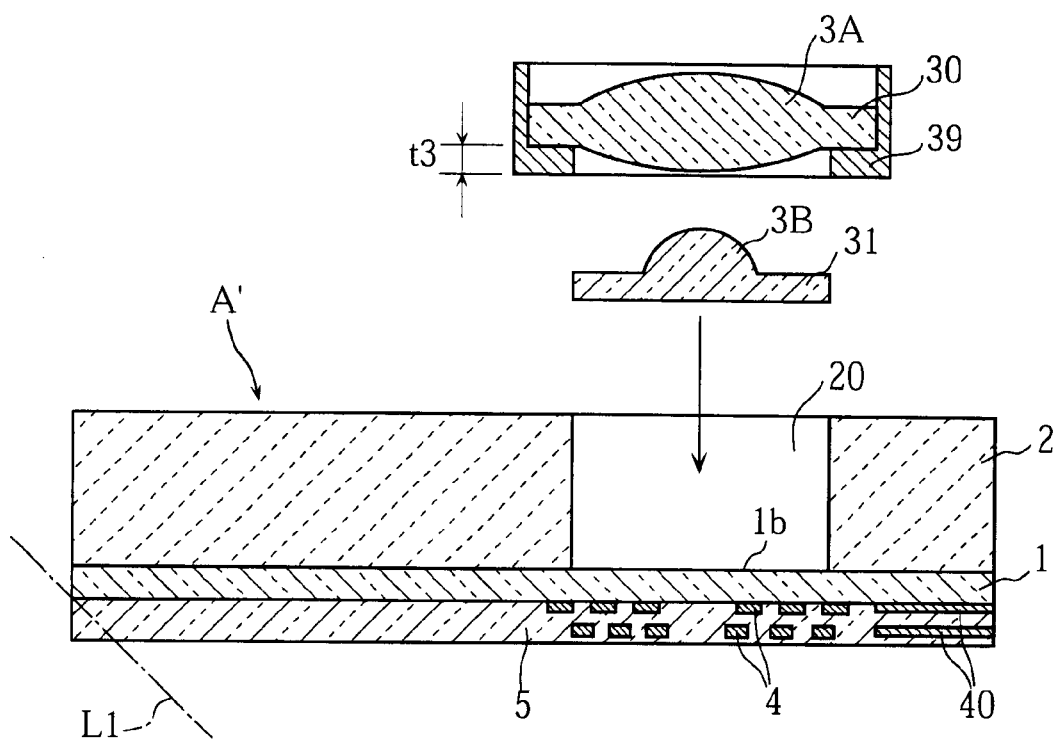

Then, the glued wafers are cut along the cut lines Lx, Ly shown in FIG. 5. Thus, a plurality of lens holder prototypes A' shown in FIG. 6 are obtained. Each prototype A' includes a transparent plate 1 and a lens holder 2 attached to the plate 1. On its lower side, the plate 1 is formed with a coil 4 and an insulating protection layer 5 enclosing the coil 4. The transparent plate 1 stems from the first wafer 1A, while the lens holder 2 stems from the second wafer 2A. The prototype A' is subjected to chamfering for forming the slant surface 19 (see FIG. 2 and line L1 in FIG. 6). The prototype A' is also subjected to electrode-forming for providing the electrodes 41 connected to the leads 40 of the coil 4 (see FIG. 2).

Then, as shown in FIG. 6, a first lens 3A and a second lens 3B are installed to the lens holder 2 of the prototype A'. Specifically, the second lens 3B is put in the through-hole 20 and then glued to the upper surface 1b of the transparent plate 1. Thereafter, the first lens 3A is mounted on the lens holder 2 through a lens attachment 39 which is glued to the upper surface of the lens holder. In installing the first and the second lenses 3A and 3B, the positions of the respective lenses are monitored by optical means, so that the center of each lens will be aligned with the center of the coil 4. Basically, the distance between the first and the second lenses 3A, 3B is defined by the thickness of the lens holder 2 and the thickness t3 of the lens attachment 39. However, this distance may be adjusted by shifting the lens attachment 39 relative to the lens holder 2 by e.g. interposing a suitable spacer between the attachment 39 and the holder 2. In this manner, the focus of the lens system can be adjusted properly.

According to the above method, the optical head Hd shown in FIGS. 1 and 2 is obtained with great productivity due to the collective production of a number of identical optical heads.

In the above-descried method, the installation of the first and the second lenses 3A, 3B is performed after the cutting of the wafers 1A, 2A. This order is advantageous to preventing the lenses 3A and 3B from being damaged during the wafer cutting procedure. The present invention, however, is not limited to this, and the order may be reversed.

The function and advantages of the optical head Hd will now be described below.

The basic function of the optical head Hd of the present invention is the same as that of a conventional optical head. Specifically, the optical head Hd serves as a slider designed to float slightly above the MO disk D rotating at high speed. The laser beam emitted from a light source (not shown) is caused to converge as passing through the first and the second lenses 3A and 3B, whereby a small light spot is formed on the recording layer 99 of the disk D. The coil 4 generates a magnetic field required for performing data-writing by magnetic field modulation.

In the optical head Hd, the flat lens surface of the second lens 3B is attached to the upper surface 1b of the transparent plate 1, and this upper surface is attached to the flat bottom surface 2a of the lens holder 2. Thus, the second lens 3B can be easily positioned in a non-slanting manner relative to the bottom surface 2a of the holder 2. Accordingly, coma (which would otherwise occur due to the tilting of the second lens 3B) will be prevented from occurring, and the diameter of the light spot on the recording layer 99 is advantageously small. Further, the close-fitting of the flange 31 with the through-hole 20 facilitates the center alignment between the second lens 3B and the through-hole 20. In inserting the second lens 3B into the through-hole 20, the flange 31 may be grasped so that the functional lens surfaces of the lens 3B will not be damaged.

Turning to the first lens 3A, the lens attachment 39 is attached to the upper surface 2b of the lens holder 2. Thus, when the lower and the upper surfaces 2a, 2b of the holder 2 are parallel to each other, the first lens 3A can be installed in a non-slanting manner relative to the lower surface 2a of the lens holder 2. As a result, coma, which would otherwise be caused by the tilting of the first lens 3A, is prevented from occurring. The distance between the first and the second lenses 3A, 3B can be adjusted by changing the thickness of the holder 2.

As known in the art, the wavelength of semiconductor laser may vary with temperature. When the wavelength varies, the refractive index of the object lens system will change. In such an instance, the laser beam may fail to be properly focused onto the desired portion of the storage disk. To overcome this problem, the objective lens system may be composed as an achromatic lens system by using a converging lens and a diverging lens in combination. The lens system of the present invention may include a third lens in addition to the first and the second lenses. A lens of the lens system may be provided with a hologram (diffracting grating) for coping with the wavelength variation of the laser beam.

Figure 7:
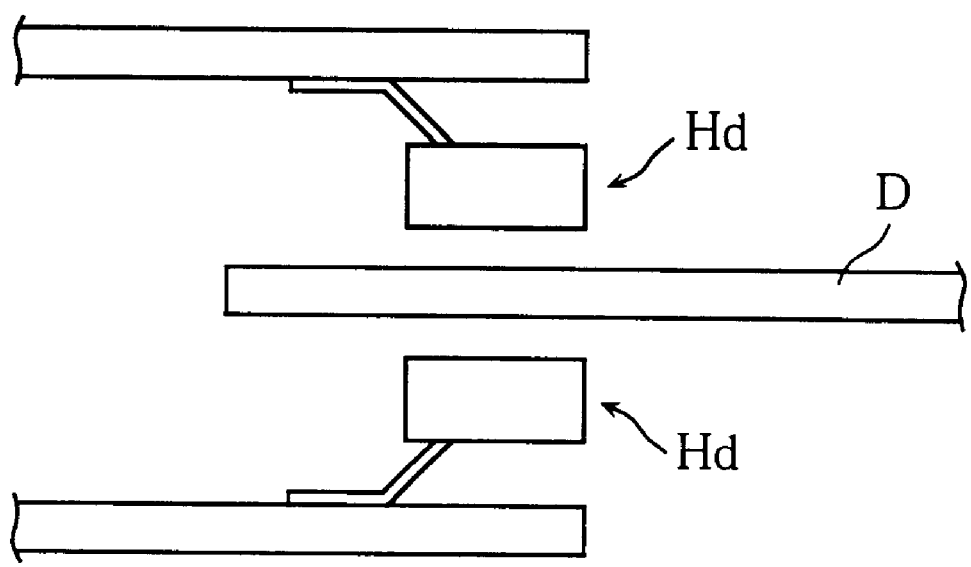
FIG. 7 is a side view illustrating a two-head type optical disk apparatus.

Referring to FIG. 7, two optical heads Hd may be used for one MO disk D provided with two recording layers (not shown) facing upward and downward. In this instance, the optical heads Hd are arranged symmetrically to each other with respect to the disk D. The both heads Hd are moved together in parallel to the disk D, so that the mutually facing relation across the disk D is maintained. In this manner, it is possible to cancel out the pressing forces exerted on the disk D by the two heads Hd. This is advantageous to preventing the warping of the disk D.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An optical head comprising:
   a lens holder that is formed with a through-hole and includes an obverse surface and a reverse surface, the obverse surface facing an optical data storage medium;
   a first lens supported by the lens holder;
   a second lens arranged in the through-hole, the second lens being closer to the storage medium than the first lens is;
   a coil that generates a magnetic field; and
   a transparent plate bonded to the lens holder;
   wherein the transparent plate includes a first surface on which the coil is provided and a second surface opposite to the first surface, the second lens being bonded to the second surface of the transparent plate.

2. The optical head according to claim 1, wherein the transparent plate entirely covers the obverse surface of the lens holder.

3. The optical head according to claim 1, wherein the second lens includes a flat lens surface and a non-flat lens surface, the flat lens surface being held in surface contact with the transparent plate.

4. The optical head according to claim 1, wherein the second lens is provided with a flange held in engagement with the through-hole of the lens holder.

5. The optical head according to claim 1, wherein the first lens is attached to the reverse surface of the lens holder.

6. The optical head according to claim 1, wherein the lens holder is made of an electrically non-conductive material.

7. The optical head according to claim 1, wherein the second lens and the transparent plate are equal in refractivity.

8. The optical head according to claim 1, wherein each of the first and the second lenses is an achromatic lens.

9. The optical head according to claim 1, wherein the second lens and the transparent plate are complementary to each other in thickness.

10. The optical head according to claim 1, wherein the lens holder is supported by an elastic suspension so as to float above the storage medium when the storage medium rotates.

11. An optical disk apparatus comprising:
    a data-recording optical disk including a first surface and a second surface opposite to the first surface;
    a first optical head facing the first surface; and
    a second optical head facing the second surface and arranged symmetrically to the first optical head with respect to the optical disk;
    wherein each of the first and the second optical heads comprises:
    a lens holder formed with a through-hole;
    a plano-convex lens arranged in the through-hole and including a flat lens surface; and
    a transparent plate bonded to the lens holder and held in surface contact with the flat lens surface of the plano-convex lens.

12. The optical disk apparatus according to claim 11, wherein the first and the second optical heads are urged toward the optical disk with a substantially equal force.

13. A method of making an optical head comprising the steps of:
    preparing a transparent first plate;
    forming a plurality of coils on the first plate;

forming an insulating protection layer that covers the coils;

preparing a second plate formed with a plurality of through-holes;

producing a plate assembly by bonding the first and the second plates to each other; and placing a lens in each of the through-holes;

wherein the lens is bonded to the first plate in the lens placing step.

14. The method according to claim 13, further comprising the step of cutting the plate assembly in a manner such that each of the through-holes is kept undivided.

15. The method according to claim 13, further comprising the step of reducing a thickness of the first plate after the protection layer forming step and before the plate assembly producing step.

* * * * *